United States Patent [19]

Johnson

[11] 4,120,411
[45] Oct. 17, 1978

[54] PORTABLE BATTERY CART

[76] Inventor: Bobby L. Johnson, 508 Crane Ave., Greenville, S.C. 29611

[21] Appl. No.: 833,495

[22] Filed: Sep. 15, 1977

[51] Int. Cl.² ............................................. B60P 1/32
[52] U.S. Cl. .............................. 214/38 BA; 104/34; 104/235; 214/514; 214/654
[58] Field of Search ............... 214/38 B, 38 BA, 82, 214/514, 654; 104/34, 165, 172 R, 235, 236, 237

[56] References Cited

U.S. PATENT DOCUMENTS

| | | | |
|---|---|---|---|
| 3,036,721 | 5/1962 | Neher | 214/75 H |
| 3,067,893 | 12/1962 | Grove | 214/514 |
| 3,122,244 | 2/1964 | Corso | 104/34 X |
| 3,150,787 | 9/1964 | Patrignani | 214/514 |

Primary Examiner—Robert G. Sheridan
Attorney, Agent, or Firm—Bailey, Dority & Flint

[57] ABSTRACT

A portable battery cart is disclosed for transporting electrical batteries including a wheeled base frame and an elevator platform carried by the base frame. A jack lift is provided for moving the elevator platform vertically relative to the base frame. A movable frame is carried by the elevator platform and a rotatable drive assembly is provided for moving the movable frame means in a generally horizontal direction relative to the elevator platform. The elevator platform includes a plurality of rollers and the movable frame includes a latch member for attachment to the battery so that the battery moves with the frame means over the rollers for loading and unloading from a roller platform of an associated storage rack.

7 Claims, 5 Drawing Figures

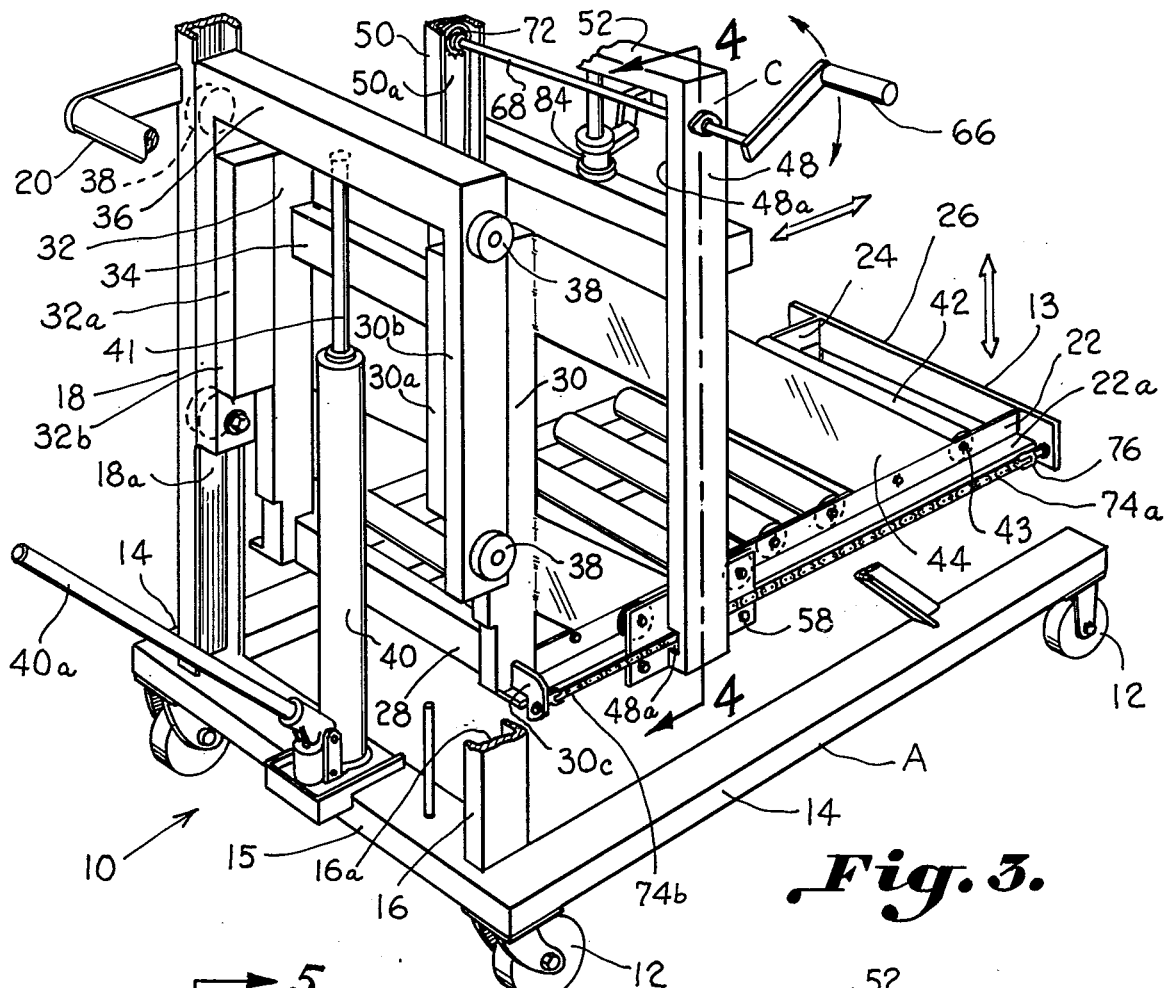
Fig. 3.
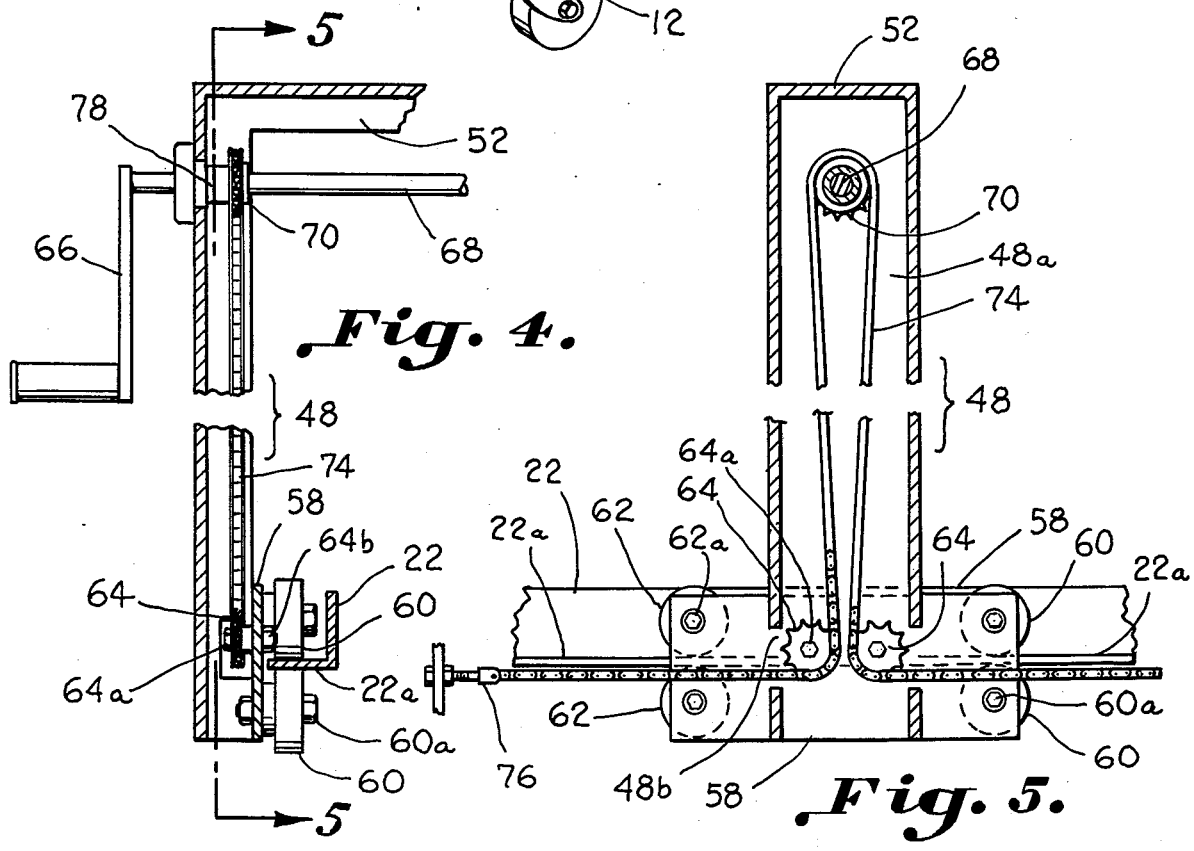
Fig. 4.
Fig. 5.

PORTABLE BATTERY CART

BACKGROUND OF THE INVENTION

Many types of industrial vehicles, such as motorized fork lifts used in and around warehouses for moving material and merchandize, utilize electrical motors which are powered by electrical batteries. It is normally more expedient to exchange the batteries when they need recharging instead of recharging the battery in the vehicle since this would require the vehicle to be out of use during recharging. Due to the large size and weight of the industrial batteries it becomes an expedient to provide a cart vehicle for transporting the batteries during exchange.

One attempt to provide a battery cart for transporting these batteries includes a wheeled base platform and an elevator platform carried thereon having a plurality of platform rollers. One such device is manufactured by Sackett-Chicago Inc., of Schaumburg, Illinois. The elevator platform is normally operated by a jack and a cable and winch arrangement is provided for pulling the battery onto the elevator platform when loading from an adjacent storage platform. During unloading from the cart, the battery is pushed manually. Due to the large size and weight of the batteries they are susceptible to uncontrolled manual handling which can result in the battery or cart becoming off balanced. If the battery is rolled too suddenly onto the battery cart, sudden acceleration of the cart backwards can result when the battery hits the back of the cart. When brakes are utilized on the cart, such uncontrolled rolling of the battery onto the cart can cause tipping of the cart. In the event a battery should fall or drop onto the floor during manual handling thereof, cracking of the battery case and spillage of chemicals can occur resulting in property damage and/or personal injury. Brakes are also not satisfactory for preventing any relative movement between the battery cart and the storage rack when a battery is moved therebetween. If the brakes should accidentally release, the battery may possibly be unbalanced either over the cart or storage platform causing accidental damage.

SUMMARY OF THE INVENTION

It has been found that an improved battery cart can be provided for transporting electrical batteries and loading and unloading the same from an associated storage rack having a roller platform wherein the cart is of the type having a wheeled base frame, an elevator platform carried by the base frame having a plurality of rollers over which the battery is rolled and lift means for raising the platform. The improvement comprises a movable frame carried by the elevator platform and drive means for moving the movable frame in a generally horizontal direction relative to the elevator platform. A latch is carried on the movable frame attaching this frame and battery for movement in unison whereby loading and unloading from the associated platform can be had in a controlled manner. Additionally, a hook means is carried by the elevator platform for attachment to a complimentary portion of the storage platform whereby the cart and storage platform may be united for loading and unloading the battery.

Accordingly, an important object of the present invention is to provide a battery cart for transporting an electrical battery which provides for loading and unloading of the battery from the cart in a highly controlled and safe manner.

Another important object of the present invention is to provide an improved battery cart having a horizontally movable frame which attaches to the battery and moves in unison therewith having positive drive means for moving the frame permitting controlled movement of the battery on and off of the cart.

Another important object of the present invention is to provide a battery cart for transporting batteries which may be united with an associated storage rack in a manner preventing any relative movement therebetween whereby loading and unloading of a battery between the cart and storage platform can be had so as to avoid accidents.

Another important object of the present invention is to provide a battery cart for transporting batteries which is simple in operation and can be used to safely load and unload the batteries from an associated storage rack by a single operator.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 3 is a perspective view with certain parts broken away illustrating a battery cart constructed in accordance with the present invention, FIG. 4 is a sectional view taken along line 4—4 of FIG. 3 illustrating the drive assembly for horizontally moving the movable frame according to the invention, and FIG. 5 is a sectional view taken along line 5—5 of FIG. 4 illustrating in more detail the drive assembly according to the present invention.

DESCRIPTION OF A PREFERRED EMBODIMENT

Figure 1:
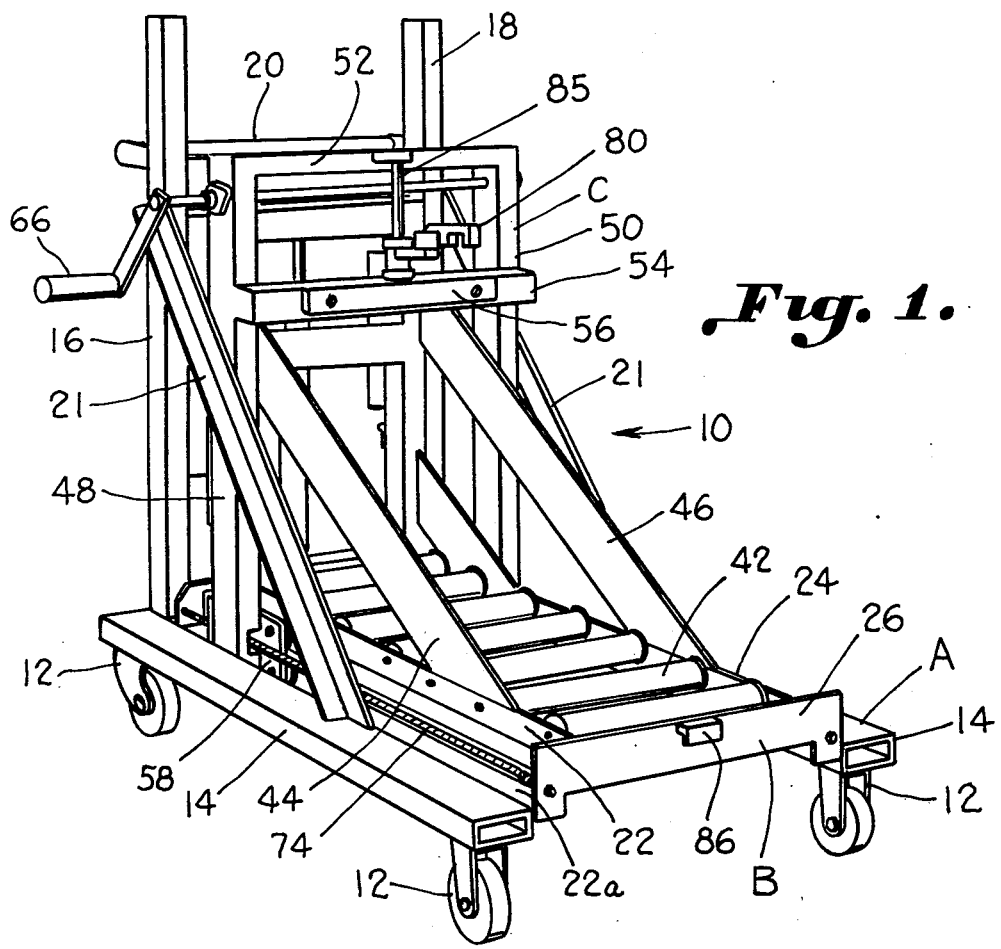
FIG. 1 is a perspective view illustrating a battery cart constructed in accordance with the present invention.
Figure 2:
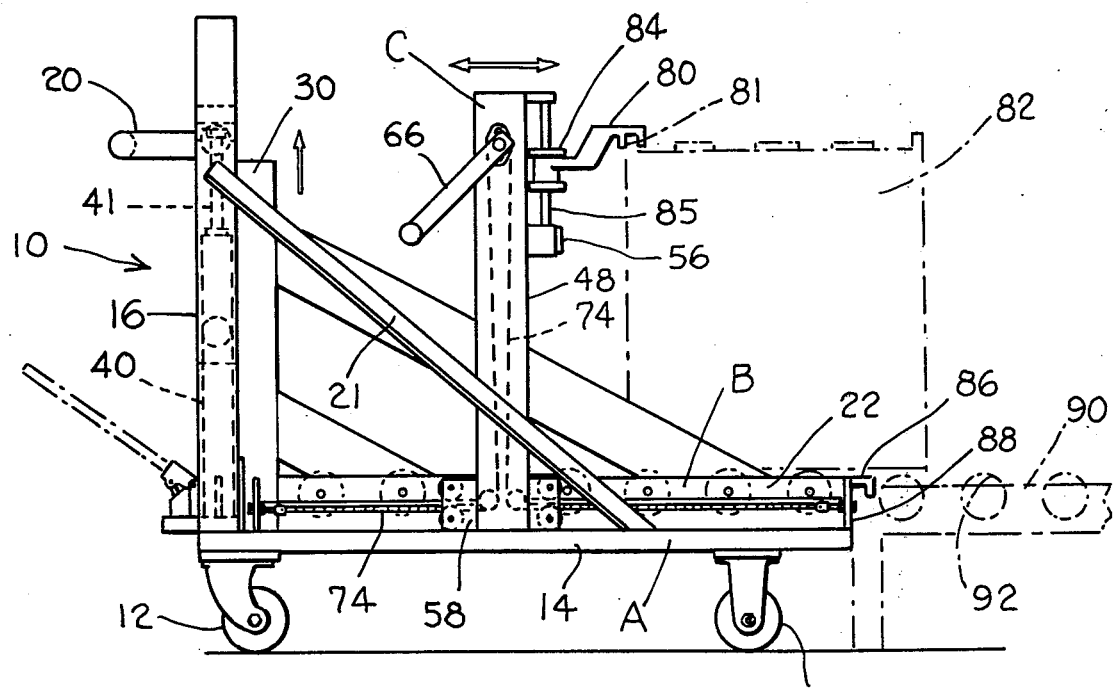
FIG. 2 is a side elevational view illustrating a battery cart constructed according to the present invention as utilized in loading and unloading a battery from an associated storage platform.

The invention relates to portable cart devices and more particularly to a portable cart for transporting industrial type electric batteries for use in electrical vehicles.

The drawings illustrate a portable cart device illustrated generally at 10 having a wheeled base frame A and an elevator platform B carried by the base frame. A lift jack is provided for moving the elevator platform B vertically relative to the base frame A. A movable frame C is carried on the elevator platform B and a rotatable drive is provided for moving the movable frame C horizontally relative to the elevator platform.

As illustrated, the base frame A is provided with a plurality of caster type wheels 12 on which the cart rolls. The base frame A includes a generally U-shaped frame having a pair of spaced legs 14 joined by a bridge leg 15, all of which may be made integral such as by welding. The base frame A further includes a pair of upstanding channel leg members 16 and 18 having a handle member 20 bridging therebetween. The legs 16 and 18 are spaced apart in a generally parallel configuration and made integral with the base frame A in any suitable manner such as by welding. A pair of side frame members 21 connect the upstanding legs 16 and 18 with horizontal frame legs 14.

The elevator platform B includes a rectangular frame having a pair of side angle iron members 22 and 24 joined together at their respective ends by a front plate 26 and tubular back plate 28. Integral with the frame is a pair of upstanding leg members 30 and 32 joined together by a cross-leg 34 adjacent the top thereof and by the back plate 28 adjacent the bottom thereof. Each leg 30 and 32 carries a rearward extension leg 30a and 32a, respectively, which in turn, carries a side mounted leg 30b and 32b, respectively. The side legs 30b and 32b are joined together at the top thereof by a bridging leg assembly 36.

Each side leg 30b and 32b carries a pair of vertically spaced roller members 38. The rollers 38 are received within the channels 16a and 18a of the respective upstanding legs 16 and 18 which provide a vertical guide for the movement of platform B. A lift means 40 is provided by a hydraulic jack whose cylinder is carried on the base frame A and whose piston rod member 41 is attached to the elevator platform such as by welding to the bridge assembly 36. Thus, actuation of the hydraulic jack 40 by handle member 40a causes raising and lowering of the elevator platform B with rollers 38 being guided within the channels 16a and 18a. It is to be understood that rollers 38 may be mounted in any suitable manner to the side legs 30b and 32b such as by conventional nut and bolt members.

The floor of elevator platform B is provided by a plurality of cylindrical roller members 42 on which the transported battery rolls for loading and unloading. It is preferred that the roller members 42 be of a high density plastic. The rollers are carried by dowels 43 received in openings in the respective side angle members 22 and 24. Connecting flange members 44 and 46 connect the respective side angles 22 and 24 with vertical legs 30 and 32 to complete the structure of the elevator platform B.

The movable frame means C includes a pair of upstanding legs 48 and 50 connected at the top thereof by a cross member 52. A second cross member 54 is carried between the legs 48 and 50 and carries a resilient wear and shock pad member 56. Carried adjacent the lower portion of each leg member 48 and 50 is a roller assembly 58. Each roller assembly 58 includes a pair of vertically spaced rollers 60 and a second pair of vertically spaced rollers 62 which are laterally spaced from the rollers 60. Between the set of rollers 60 and 62 carried on leg 48, a horizontal flange member 22a of side angle 22 is sandwiched providing a guide surface over which the rollers roll. The rollers 60 and 62 are carried by a plate 58a welded to the legs which also carries a pair of idler sprockets 64 which are rotatably mounted on bolt spindles 64a attached to the plate 58a by means of nut member 64b. Rollers 60 and 62 are likewise mounted on bolt spindles 62a and 60a secured to the plate 58a by nut members. An identical roller assembly is carried adjacent the bottom of leg 50 and rolls on a horizontal flange of side angle 24 in an identical manner.

The rotatable drive for moving the frame means C in a general horizontal direction is provided by a manually rotatable handle 66 connected to a shaft 68 for rotating the shaft. A pair of drive sprockets 70 and 72 are affixed adjacent the ends of the shaft 68 for rotation therewith. Track means in which the rotatable sprockets 70 and 72 travel is provided by a chain link belt 74 carried on both sides of the elevator platform B in a manner as best shown in FIGS. 4 and 5. As illustrated therein, the chain link belt is affixed by suitable nut and bolt means 76 at each end of the elevator platform B. One end of the chain 74a is affixed to the front plate 26 of the elevator platform and the other end 74b of the link chain is connected to a tab flange 30c integral with the vertical leg 30. Intermediate the ends of the chain 74 the chain engages the idler sprockets 64 and at its length intermediate the idler sprockets engages the drive sprocket 70. Accordingly, as the handle 56 is rotated in either the clockwise or counter-clockwise direction, the drive sprockets engage the chain 74 moving the frame C linearly along the guide flanges 22a and 24a. Positive well-defined incremental movement of the frame C may be had as the drive sprockets travel along the links of the chain 74 producing well controlled movement of the frame and battery moved thereby.

It is noted that the link chain 74 is housed within the channels 48a and 50a of the respective frame legs of the frame C and that each frame leg 48 and 50 is open at 48b and 50b to permit passage of the chain 74. The shaft 68 may be journaled in suitable bearings 78 for rotation relative to the frame leg of movable frame C.

A latch means is provided by a latch hook member 80 carried on the movable frame C for attaching the frame to a complimentary portion 81 of a battery 82 being transported. The latch means includes a collar member 84 slideably and rotatably carried on a spindle 85 which is carried between cross leg members 52 and 54 in any suitable manner. The hook latch 80 is integral with the collar 84 so that it may be raised and lowered vertically as well as pivoted horizontally for engagement with the battery 82. With the battery 82 latched to the movable frame C the movable frame and battery move in unison as the handle 66 is rotated. Thus, the battery may be unloaded and loaded from the cart 10 by a controlled motion without sudden jerking or other uncontrolled motion tending to throw the cart and battery off balance.

A hook member 86 is carried on the front of the elevator platform for engagement with a front plate 88 of an associated storage rack platform 90 from which batteries are loaded and unloaded. The platform of the storage rack 90 is made similar to the floor of elevator platform B in that it includes a plurality of plastic rollers 92. According to the invention, with the hook member 86 uniting the cart 10 and the storage rack 90 movement of the battery 82 either onto or off of the storage rack will be as if the roller floor of the elevator platform and storage rack are one and the same and there is no possibility of separation of the two during movement of the battery. Since the battery is moved in deliberate and controlled linear motion by movement with the frame members C, it is highly unlikely that any tipping of the cart or dropping of the battery will occur.

Thus, it can be seen that a highly advantageous construction can be had for a portable battery cart in accordance with the present invention wherein the battery cart is secured to the storage and loading platform while the battery is secured to a movable frame of the battery cart whereby any sudden accidental motion of both the battery cart and battery is minimized. Even batteries of large industrial sizes may be loaded and unloaded for exchange with used or fresh batteries by a single operator. The cart is highly compact and economical in cost and requires little maintenance. The entire structure thus disclosed may be assembled in any suitable manner and is preferably made integral by welding.

While a preferred embodiment of the invention has been described using specific terms, such description is for illustrative purposes only, and it is to be understood that changes and variations may be made without departing from the spirit or scope of the following claims.

What is claimed is:

1. A portable battery cart for transporting electrical batteries comprising:
   a wheeled base frame including a pair of laterally spaced vertical members adjacent one end thereof;
   an elevator platform carried by said vertical members of said base frame in a cantilevered manner;
   lift means for moving said elevator platform vertically relative to said base frame;
   movable frame means carried by said elevator platform including a pair of laterally spaced vertical legs with a cross member extending therebetween;
   latch means carried by said movable frame means being vertically movable relative thereto releaseably connecting said frame means to said battery;
   hook means carried by said elevator platform for connecting said cart to an associated storage platform whereon said batteries are loaded and unloaded; and
   drive means for moving said movable frame means horizontally relative to said elevator platform including a chain belt having opposing ends affixed adjacent the ends of said elevator platform, a drive sprocket carried by said movable frame means in engagement with said chain belt, and an idler sprocket carried on each side of said drive sprocket in engagement with said chain belt.

2. The structure set forth in claim 1 wherein said movable frame means includes a pair of spaced upstanding frame legs, each of said frame legs having a roller assembly carried adjacent a lower end thereof by which said frame means moves relative to said elevator platform.

3. The structure set forth in claim 2 wherein each of said roller assemblies includes vertically spaced rollers between which a horizontal flange of said elevator platform is sandwiched to provide a guide surface over which said roller assembly rolls.

4. An improved portable battery cart for transporting electrical batteries which are loaded and unloaded from an associated storage rack having a roller platform, said cart being of the type having a wheeled base frame, an elevator platform carried by said base frame member having a plurality of rollers over which said battery is rolled and lift means for raising said platform, wherein the improvement comprises:
   a movable frame means carried by said elevator platform including a pair of laterally spaced upstanding leg members having a cross member carried therebetween;
   a latch member slideably carried by said cross member;
   said latch member being vertically movable relative to said cross member and movable frame means for engaging in latching relation with a complimentary portion of said battery; and
   drive means for moving said movable frame means in a generally horizontal direction relative to said elevator platform.

5. The structure set forth in claim 4 including hook means carried by said elevator platform for uniting said cart and storage rack while a battery is being loaded and unloaded therebetween.

6. The structure set forth in claim 4 wherein said drive means includes a rotatable drive member and an incremental track means along which said drive member travels in defined increments of movement.

7. The structure set forth in claim 1 wherein vertical legs of said movable frame means include generally C-shaped channel members, said chain belt of said drive means being housed in said channel and said drive sprocket being carried within said channel.

* * * * *